H. G. Porter,

Barrel.

No. 4,272. Reissued Feb. 21. 1871.

Witnesses:
M. W. Hamilton Johnson
W. Wagner

Inventor:
H. G. Porter
By Alex. C. Klaucke & Co
Associate Attorneys

H. PETERS, PHOTO-LITHOGRAPHER, WASHINGTON, D. C.

United States Patent Office.

HENRY G. PORTER, OF GRAND RAPIDS, MICHIGAN.

Letters Patent No. 102,432, dated April 26, 1870; reissue No. 4,272, dated February 21, 1871.

IMPROVEMENT IN BARRELS.

The Schedule referred to in these Letters Patent and making part of the same.

*To all whom it may concern:*

Be it known that I, HENRY G. PORTER, of Grand Rapids, in the county of Kent and in the State of Michigan, have invented certain new and useful Improvements in Barrels; and do hereby declare that the following is a full, clear, and exact description thereof, reference being had to the accompanying drawing and to the letters of reference marked thereon making part of this specification.

The nature of my invention consists in a novel mode of constructing barrels, kegs, casks, &c., as will be hereinafter fully set forth.

In order to enable others skilled in the art to which my invention appertains to make and use the same, I will now proceed to describe its construction and operation, referring to the annexed drawing, in which—

Figure 1:
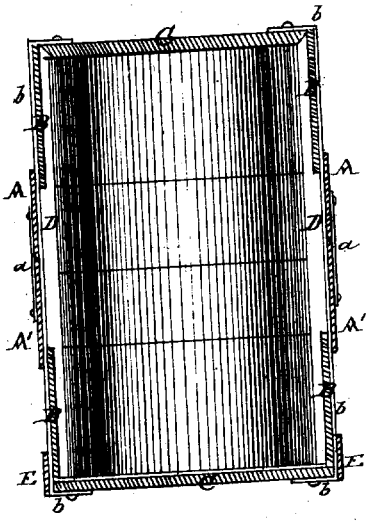

Figure 1 is a vertical section, and

Figure 2:
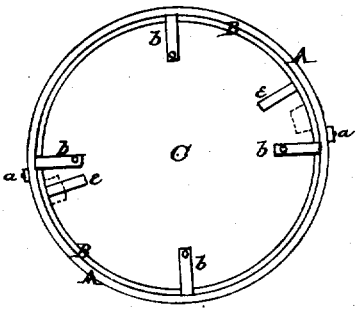

Figure 2, a plan view of my barrel.

Figure 3:
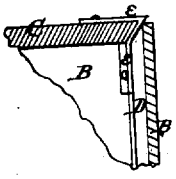
Figure 4:
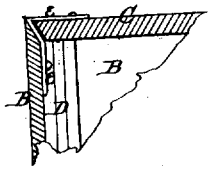

Figures 3 and 4 are enlarged sections of the same.

A and A′ represent two hoops, of suitable dimensions, put together as shown in fig. 1, their edges being beveled so as to form a joint, and further secured on the outside by means of metal strips *a a*.

At the end of each hoop thus formed on the inside is secured another hoop, B, of any desired width.

On the inside of hoops A A′ is secured a series of vertical metal strips, *b b*, which pass on the outside of the hoops B B, and turn over the edges so as to be fastened to the heads C C of the barrel.

The ends of the hoops B B are beveled on the inside, and the edges of the heads C C are beveled to correspond, as shown in figs. 3 and 4, so as to fit nicely.

The barrel thus formed is strengthened on the inside by ribs D D. These ribs may either be straight, extending from top to bottom of the barrel, or one portion of them may extend between the lower rim of the upper section B, and the upper rim of the lower section B, as shown at D′, these sections B resting on this extension D′, and thus relieving the middle sections or section of some of the strain.

It is obvious that it is not absolutely necessary that these ribs should extend the full length of the barrel, as they will act precisely in the same way if only extending between the upper and lower sections; and it is equally obvious that, as far as the braces are concerned, it is immaterial whether the middle section consists of one or more parts A or A′.

When the braces D extend the whole length of the barrel their ends are beveled, and the heads C C are cut out or notched on their inner sides, so as to fit on the ends of said ribs.

The heads C C may be further strengthened by means of smaller hoops E on the outside of the barrel, and they may be further secured by metal strips *e e*, as shown in figs. 3 and 4.

One of said strips is nailed on the inside of one of the ribs D, and bent over the edge of the head, and secured to the outside of the same. The other strip *e* is secured to the inside of the barrel itself, and fastened in like manner to the outside of the head.

I do not mean to be understood as confining myself to the use of all these various parts in one barrel, keg, or cask, as I may, for instance, use a series of hoops, A A′, connected in the manner above described, dispensing with the hoops B B; or I may dispense with some of the fastenings, according as more or less strength is required.

Having thus fully described my invention,

What I claim as new, and desire to secure by Letters Patent, is—

1. A barrel, constructed of three cylinders A B B, the middle cylinder A overlapping the others, and constructed in one or more sections, substantially as shown and described.

2. In combination with a barrel, having a series of horizontal sections, A or B, beveling the inner edges of the top section and the circumference of the top C, so, when placed together, they form an even surface on top, as shown and described.

3. In combination with the top C and horizontal sections A or B, the elongated brace *b*, which extends on the exterior of the sections, and is bent over on the cover, and under on the bottom, all as set forth.

4. In combination with the top section B and cover C, or bottom section and bottom proper, the metallic brace *e*, passing from the inner part of the section, between it and the cover, or bottom, and over and upon the cover or bottom, as set forth.

5. The ribs D, when arranged in a barrel, constructed of three or more horizontal sections, to extend either the full length of the barrel or only between the upper and lower sections of the same, substantially as and for the purpose described.

HENRY G. PORTER.

Witnesses:

OMAR H. SIMONDS,
EDWARD TAGGART.